United States Patent [19]

Murayama et al.

[11] 4,141,424

[45] Feb. 27, 1979

[54] TRANSMISSION FOR TRACTORS

[75] Inventors: Yoshinobu Murayama; Kenzo Sada; Mitsuhiro Kutomi, all of Sakai, Japan

[73] Assignee: Kubota Ltd., Osaka, Japan

[21] Appl. No.: 727,445

[22] Filed: Sep. 28, 1976

[51] Int. Cl.² .................. B60K 17/28; B60K 17/08
[52] U.S. Cl. .......................... 180/53 CD; 74/15.4; 74/372; 180/70 R
[58] Field of Search ........... 180/53 R, 53 CD, 70 R; 74/15.4, 15.68, 15.8, 15.82, 15.86, 15.88, 371, 372, 798; 64/11 F

[56] References Cited

U.S. PATENT DOCUMENTS

| | | | |
|---|---|---|---|
| 1,171,103 | 2/1916 | Demarchi | 74/372 |
| 1,371,187 | 3/1921 | Pulliam | 74/372 |
| 1,661,892 | 3/1928 | Girones | 74/371 |
| 2,728,208 | 12/1955 | Ehmann | 64/11 F |
| 2,810,293 | 10/1957 | George et al. | 180/53 CD |
| 2,861,461 | 11/1958 | Kreidler | 74/371 |
| 2,987,134 | 6/1961 | Myers | 180/53 R |
| 3,060,767 | 10/1962 | Parrett | 74/798 |
| 3,733,912 | 5/1973 | Murayama et al. | 74/15.4 |

FOREIGN PATENT DOCUMENTS 1184167  2/1959  France ........................ 74/371

*Primary Examiner*—Kenneth H. Betts
*Attorney, Agent, or Firm*—Koda and Androlia

[57] ABSTRACT

A speed change mechanism for a transmission comprises a main shaft provided with a plurality of power transmitting gears, and a propelling speed change gear system and a power takeoff speed change gear system supported on the opposite sides of the main shaft in parallel thereto. Each of the propelling and power takeoff speed change systems includes a speed change shaft freely rotatably carrying a suitable number of speed change gears meshing with the power transmitting gears on the main shaft at all times. The speed change shaft accommodates an axially slidable speed change rod which, when moved, forces pins outward or inward radially of the shaft to couple the speed change shaft to the corresponding speed change gear or disconnect the shaft from the gear. The freely rotatable speed change gears are held against axial movement, while axially slidable engaging members which are otherwise provided between the adjacent speed change gears are eliminated. The transmission therefore has a shortened axial length and does not require a clutch which must be usually provided between the engine and the main shaft. The propelling speed change system further incorporates a creeping assembly of the planetary roller type for super-speed reduction and is provided with a secondary speed change assembly. The transmission also includes a power takeoff assembly for driving the front wheels of the tractor utilizing the secondary speed change assembly.

5 Claims, 7 Drawing Figures

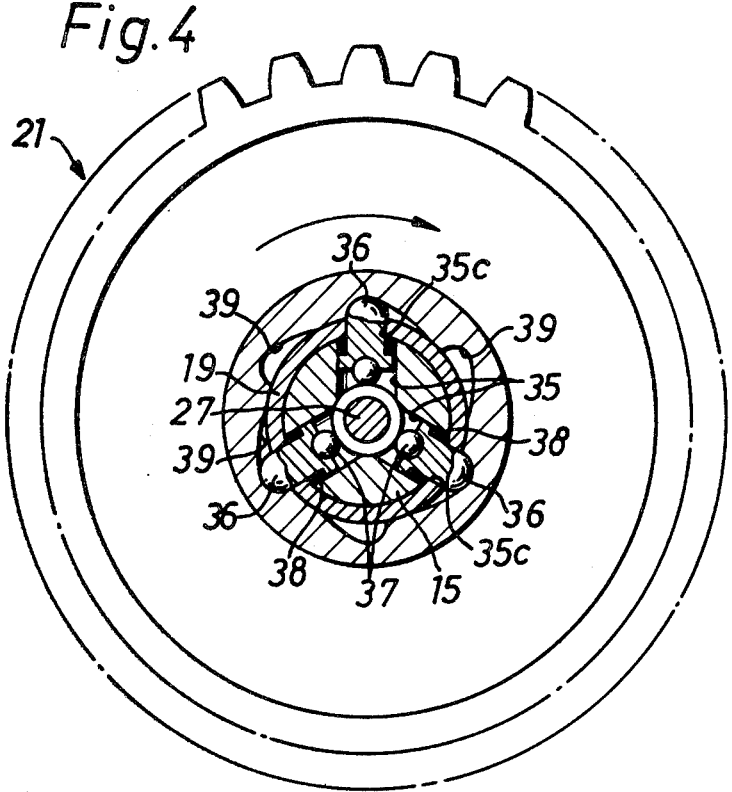
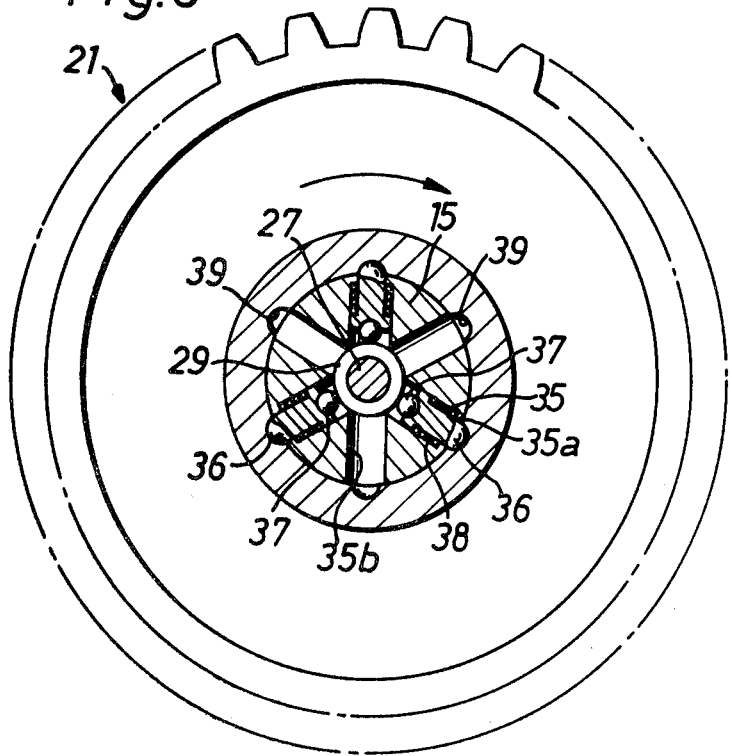

TRANSMISSION FOR TRACTORS

BACKGROUND OF THE INVENTION

The present invention relates to a transmission for transmitting the power of an engine to propelling and power takeoff systems at the desired number of speed change steps, and more particularly to improvements in speed change mechanism.

Transmissions of agricultural and civil engineering tractors have much higher speed reduction ratios at low speeds than motor vehicles and require many steps of speed changes. Thus transmissions comprising a gear speed change mechanism include very complex speed change gear systems, are very cumbersome to design and make and involve difficulties in accommodating shafts in a limited space.

Tractor transmissions comprising a gear speed change mechanism are generally of the selective mesh type and constant mesh type. In either type, gears or engaging members or clutch pawls are slidingly moved in the axial direction to give desired speed changes so that the mechanism requires an elongated axial length, is subject to damage to gears and gives off a noise. Moreover, each speed change procedure requires engagement and disengagement of the clutch.

More specifically, with the selective mesh type in which a speed change gear on the speed change shaft is slidingly moved to give the desired speed change, the shaft must have a length which is greater by at least the distance of the sliding movement of the gear. The use of gears which must be in the form of a spur gear further gives off a loud noise and involves difficulties in meshing gears due to the difference in peripheral speed between the gears, possibly leading to damage to the gears.

With the constant mesh type, gears on the main shaft are always in mesh with speed change gears on the speed change shaft which is provided with clutch pawls slidable thereon. Accordingly the shaft must be elongated by at least the sliding distance of the clutch pawls. In addition, since the clutch pawls are adapted to engage with or disengage from rotating wheels, the mechanism is subject to damage due to impact.

The gear speed change mechanism invariably requires a clutch which is provided between the engine and the main shaft and which must be disengaged for a speed change. Because the main shaft continues to idly rotate even after the clutch has been disengaged, the speed change action involves a delay especially in the case of the selective mesh type. Tractor transmissions comprising two systems, i.e. a propelling and a power take off system further necessitate a double clutch which is expensive.

SUMMARY OF THE INVENTION

An object of this invention is to provide a transmission for tractors comprising a three-shaft main speed change mechanism in which a propelling speed change shaft and a power takeoff speed change shaft are disposed on the opposite sides of a main input shaft in parallel thereto, the speed change shafts carrying freely rotatable speed change gears arranged side by side and meshing with gears on the main shaft at all times, the speed change gears being operable by speed change means of the pin engageable type accommodated within the speed change shafts to effect speed changes as desired.

Another object of this invention is to provide a transmission in which speed change means of the pin engageable type is accommodated in each of the speed change shafts to eliminate the necessity for sliding speed change gears or engaging members on the shaft, thus shortening the axial length of the shafts and therefore the length of the transmission.

Another object of this invention is to provide a transmission which does not require a clutch between the engine and the main shaft for effecting and interrupting power transmission and which is provided with a shock-absorbing coupling alone for mitigating the small impact produced by a speed change action.

Another object of this invention is to provide a transmission wherein speed changes can be effected merely by sliding a single speed change rod accommodated in the speed change shaft, the speed change rod being operable at a suitable remote position and affording increased freedom of design.

Another object of this invention is to provide a transmission incorporating a speed reduction assembly of the planetary roller type as creeping means disposed immediately subsequent to the main speed change assembly for the propelling system, the planetary roller assembly including planetary rollers each comprising inner and outer metal rings which are joined together by an elastic member which is elastically deformable at least diametrically, whereby the desired torque is transmitted at reduced speed whereas excess torque is reduced by the slippage of the planetary rollers so as to eliminate damage to terminal shafts and gears.

Still another object of this invention is to provide a transmission wherein speed change means of the pin engageable type is incorporated also in a secondary speed change assembly disposed to the rear of the propelling main speed change assembly, the secondary speed change assembly providing power takeoff for driving the front wheels in synchronism with the rear wheels.

Other objects and features of this invention will become apparent from the following description of the preferred embodiments with reference to the accompanying drawings. Various modifications and alterations in the details of the construction are included within the scope of the appended claims.

BRIEF DESCRIPTION OF THE DRAWINGS

FIG. 4 is an enlarged view in section showing the assembly of FIG. 3 as it is seen from the right side of FIG. 3;

FIG. 6 is an enlarged side elevation showing the assembly of FIG. 5 as it is seen from the right side of FIG. 5.

DETAILED DESCRIPTION OF THE INVENTION

Figure 1:
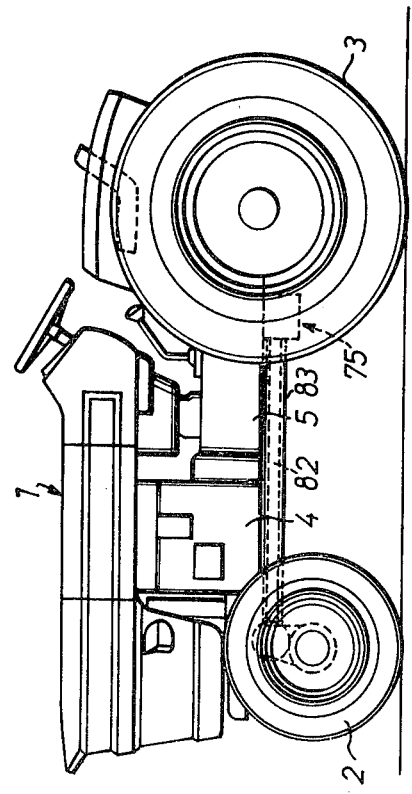
FIG. 1 is a side elevation showing the appearance of a tractor incorporating the transmission of this invention.

FIG. 1 shows a tractor including a frame 1, front wheels 2 and rear wheels 3. The rear wheels 3 are drive wheels, while the front wheels 2 are also serviceable as drive wheels by gear change. An engine 4 mounted on a front portion of the frame 1 is connected to a transmission case 5.

Figure 2:
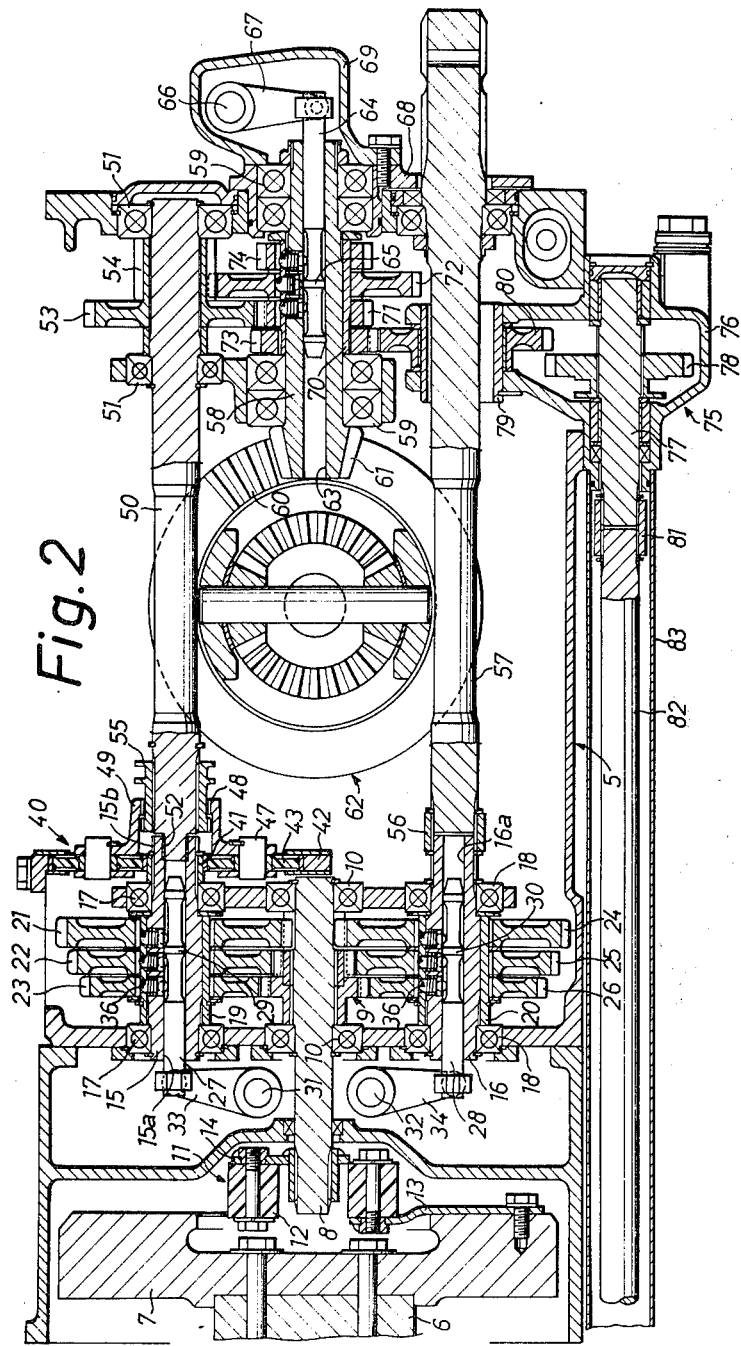
FIG. 2 is a sectional view showing the details of the interior construction of the transmission of this invention.

With reference to FIG. 2, a flywheel 7 is fixedly mounted on one end of the crank shaft 6 of the engine 4. A main input shaft 8 provided with a group of three power transmission gears 9 is supported at its opposite ends by the transmission case 5 by bearings 10. A flexible shock-absorbing coupling 11 interconnects the flywheel 7 and the front end of the main shaft 8 to transmit the power of the engine to the main shaft 8. The coupling 11 comprises an annular member 12 made of an oil-resistant elastic material such as rubber and front and rear connecting arms 13 and 14. The arm 13 is bolted to the flywheel 7, while the other arm 14 has its cylindrical portion splined to the main shaft 8.

Figure 5:
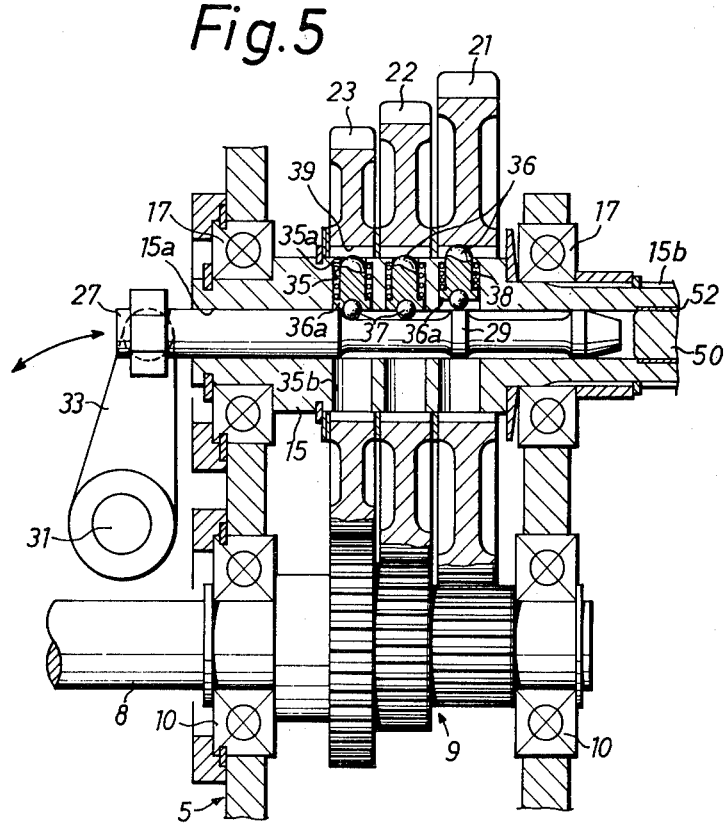
FIG. 5 is an enlarged side elevation showing another embodiment of the speed change assembly.

A propelling speed change shaft 15 and a power takeoff speed change shaft 16 extend in parallel to each other above and below the main shaft 8 and are supported at their opposite ends by bearings 17, 18 respectively. Both the shafts 15, 16 are hollow and have axial bores 15a, 16a. The shafts 15, 16 are sheathed with sleeves 19, 20 which are keyed or splined to the shafts. As shown in FIGS. 5 and 6, the sleeves can be omitted.

When the shafts 15, 16 are sheathed with the sleeves 19, 20, propelling speed change gears 21, 22, 23 and power takeoff speed change gears 24, 25, 26 are freely rotatably mounted on the sleeves 19, 20 respectively. (See FIGS. 2 to 4.) When the sleeves are omitted, the speed change gears are freely rotatably mounted directly on the shafts, as seen in FIGS. 5 and 6 representatively showing the propelling speed change shaft 15. In either case, the propelling speed change gears 21, 22, 23 and the power takeoff speed change gears 24, 25, 26 mesh with the gear group 9 on the main shaft 8 at all times.

The gears in corresponding relation to each other, namely the propelling first speed gear 21 and the power takeoff first speed gear 24, the propelling second speed gear 22 and the power takeoff second speed gear 25, and the propelling third speed gear 23 and the power takeoff third speed gear 26 are respectively identical in shape and size.

The hollow speed change shafts 15, 16 accommodate in their axial bores 15a, 16a axially slidable speed change rods 27, 28 respectively. The speed change rods 27, 28 are formed with annular projections 29, 30 and have front ends extending outward from the bores 15a, 16a.

Figure 3:
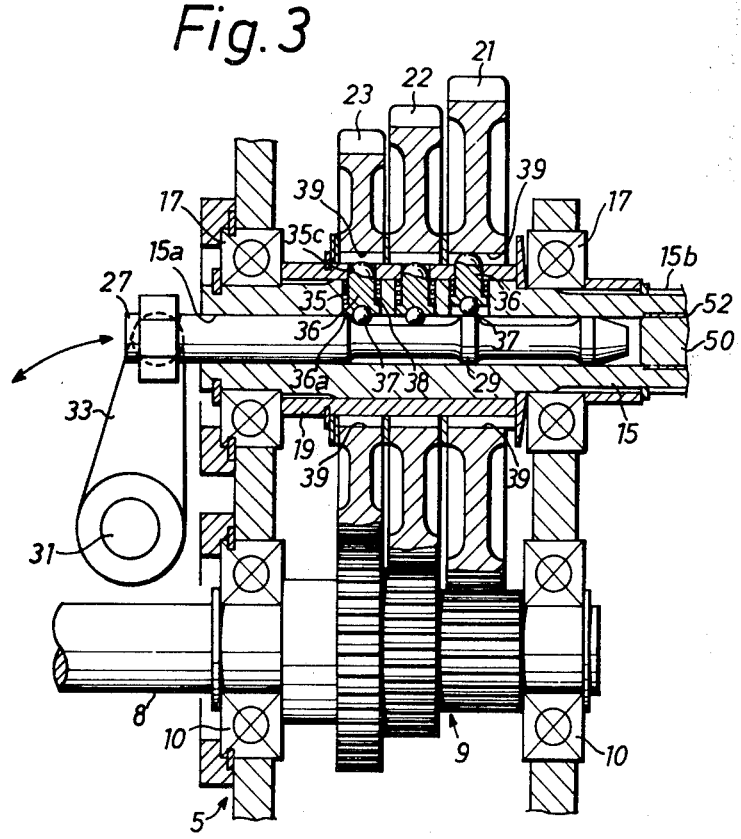
FIG. 3 is an enlarged side elevation in section showing the principal part of a speed change assembly of the pin engageable type.

A propelling lever bar 31 is supported on the case turnably about its lateral axis and is integral with a lever 33 engaged with or pivoted to the propelling speed change rod 27. A power takeoff lever bar 32 is supported on the case turnably about its lateral axis and is integral with a lever 34 engaged with or pivoted to the power takeoff speed change rod 28. As shown in FIGS. 3 and 4 in greater detail, the shafts 15, 16 are formed with pin bores 35 which are equidistantly spaced apart circumferentially of the shafts. Although FIGS. 3 and 4 show the propelling system, the power takeoff system is identical thereto.

In the illustrated embodiment, three radial pin bores 35 are formed which accommodate radially movable pins 36. Each of the pins 36 has a flange 36a in contact with a rollable ball 37 and a rounded top end. When the speed change shaft 15 is provided with the sleeve 19, coiled springs 38 are disposed between the flanges 36a of the pins 36 and the inner surface of the sleeve 19. The springs 38 urge the pins 36 radially inwardly of the shaft 15 at all times. When the sleeve is not used as illustrated in FIGS. 5 and 6, each of the bores 35 is provided with a spring receiving portion 35a, in which case the spring 38 bears against the portion 35a and the flange 36a of the pin 36. As will be apparent from FIGS. 5 and 6, when the spring receiving portion 35a is formed, a guide bore 35b must be provided for inserting the pin 36. Since the guide bores 35b reduce the strength of the shaft 15, 16, it is preferable to sheath them with the sleeves 19, 20. When the sleeves 19, 20 are used, guide holes 35c are formed in the sleeves in register with the pin bores 35 to render the pins 36 radially movable inward or outward through the holes 35c.

Each of the propelling speed change gears 21, 22, 23 and the power takeoff speed change gears 24, 25, 26 is formed in the inner peripheral surface with grooves 39 in corresponding relation to the pin bores 35. As shown in FIGS. 3 and 4, for example six grooves 39 are formed as equidistantly spaced apart in the circumferential direction. Suppose the gear is idly rotatable in the direction of the arrow in FIG. 4, the groove 39 is so shaped that its depth progressively reduces in the direction of rotation of the gear. The groove 39 may be a semicircular groove for receiving the pin 36 as shown in FIGS. 5 and 6, but when it is an elongated groove having a reducing depth as stated above, the impact at the time of engagement can be mitigated as will be described later.

Figure 7:
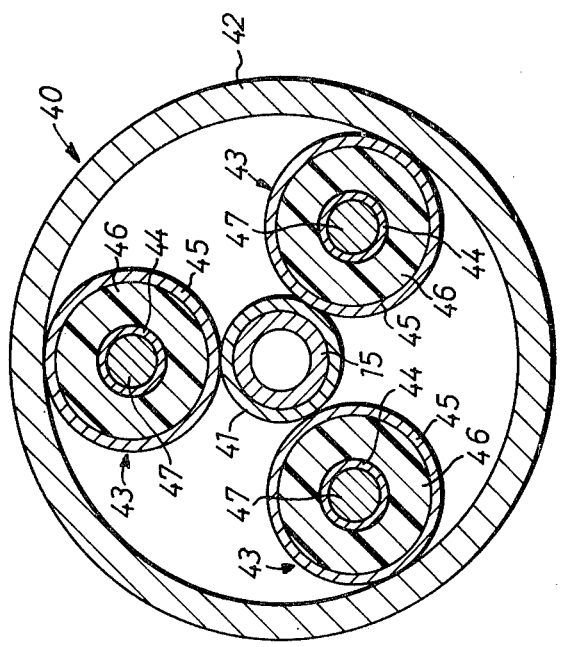
FIG. 7 is a sectional view showing a creeping assembly of the planetary roller type as it is seen from the front.

With reference to FIGS. 2 and 7, a creeping assembly 40 of the planetary roller type is provided at a rear portion of the propelling speed change shaft 15. The creeping assembly 40 comprises a sun roller 41, an annular housing 42 concentric with the roller 41 and planetary rollers 43 disposed between the sun roller 41 and the housing 42. The planetary rollers 43 are revolvable while rotating about their axes. The sun roller 41 is made of metal material and is splined or otherwise secured to the shaft 15. When the sun roller 41 is secured in position, a spline portion 15b is left exposed at the shaft end. The housing 42 surrounding the sun roller 41 has a circular inner surface and is secured to the transmission case 5. Each of the planetary rollers 43 comprises inner and outer metal rings 44, 45 and a rubber or like elastic member 46 provided between and joined to the rings. As seen in FIG. 7, three planetary rollers are rollably supported on shafts 47. The roller shafts 47 are supported by a housing 49 having an internal gear 48.

A secondary speed change shaft 50 is supported at two rear end portions thereof by bearings 51 and has a front end inserted in the axial bore 15a of the propelling speed change shaft 15 with a needle bearing 52 or the like provided therebetween. Thus the shaft 50 extends rearward coaxially with the shaft 15. The secondary speed change shaft 50 fixedly carries large and small gears 53, 54. The small gear 54 has an increased thickness. A clutch gear 55 splined to the front end of the secondary speed change shaft 50 is axially slidable. When slidingly moved leftward from the position in FIG. 2, the gear 55 is splined to the spline portion 15b of the shaft 15, directly connecting the shaft 15 to the shaft 50, whereas when moved rightward and engaged with the internal gear 48, the shaft 15 is coupled to the shaft 50 via the creeping assembly 40.

The power takeoff speed change shaft 16 is connected by a coupling 56 to a power takeoff shaft 57, the rear end of which projects outward from the rear wall of the transmission case 5. As seen in FIG. 2, the propelling secondary speed change shaft 50 is in parallel to the power takeoff shaft 57. An intermediate shaft may be provided between the shafts 15 and 50 and connected thereto with couplings. Similarly the shafts 16 and 57 may be interconnected by an intermediate shaft with use of couplings.

A drive pinion shaft 58 is interposed between the secondary speed change shaft 50 and the power takeoff shaft 57 in a rear portion of the transmission case 5. The shaft 58 is supported at its opposite ends by bearings 59 and is parallel to the shafts 50, 57. The drive pinion shaft 58 is in the form of a hollow shaft having a bevel pinion 61 at its front end and an axial bore 63. The bevel pinion 61 meshes with a bevel gear 60 of rear wheel differential unit 62.

The axial bore 63 of the drive pinion shaft 58 accommodates the same speed change means of the pin engageable type as one already described. A slidable speed change rod 64 having an annular projection 65 is inserted into the axial bore 63 from its rear end. A secondary speed change lever bar 66 turnable about its lateral axis fixedly carries a lever 67, the free end of which is engaged with or pivoted to the rear end of the speed change rod 64. A cover 69 bolted to a bearing case 68 encloses the lever 67 and the like.

The drive pinion shaft 58 is sheathed with a sleeve 70 which is splined or keyed thereto. Two secondary speed change gears 71, 72 are freely rotatably mounted on the sleeve 70. The secondary speed change gear 71 meshes with the gear 53 on the secondary speed change shaft 50, and the secondary speed change gear 72 with the gear 54 at all times. The sleeve 70 supports two other gears 73, 74. The front gear 73 is fixedly mounted on the sleeve 70, whereas the rear gear 74 is freely rotatably mounted on the sleeve 70. The gear 73 serves for rearward speed in corporation with an idle gear (not shown) provided between the thick gear 54 on the shaft 50 and the gear 74. The gear 73 serves to transmit the torque for driving the front wheels.

Each of the secondary speed change gears 71, 72 and rearwardly propelling gear 74 is formed in the inner peripheral surface with grooves equidistantly spaced apart circumferentially thereof. The grooves have the same construction as those shown in FIGS. 3 and 4.

In corresponding relation to the grooves, the pinion shaft 58 and the sleeve 70 are formed with pin bores accommodating pins which are projectable and retractable and which are biased radially inwardly of the shaft by coiled springs at all times. The grooves, pins and balls and like parts for the secondary speed change assembly have the same construction as those shown in FIGS. 3 and 4 in detail. As illustrated in FIGS. 5 and 6, the sleeve 70 can be eliminated from the secondary speed change assembly.

With reference to FIG. 2, a power takeoff assembly 75 for driving front wheels is mounted on the bottom of the transmission case 5. The power takeoff assembly 75 comprises a case 76 detachably mounted on the bottom of the transmission case 5, a transmitting shaft 77 supported by the case 76, a change gear 78 slidably mounted on the transmitting shaft 77 and an idle gear 80 freely rotatably mounted on a cylinder 79 secured to an upper portion of the case 76. The idle gear 80 meshes with the gear 73 secured to the sleeve 70 at all times. By the selective engagement of the change gear 78 with the idle gear 80, the transmitting shaft 77 is given a power in synchronism with the rear wheel driving system. The transmitting shaft 77 and the drive pinion shaft of a front wheel differential unit is interconnected by a propeller shaft 82 by means of coupling 81 and the like, whereby the front wheels can be driven. As will be apparent from FIG. 2, the power takeoff shaft 57 extends through the cylinder 79 eccentrically therewith. The space between the power takeoff shaft 57 and the cylinder 79 resulting from the eccentric arrangement permits changes in the number of the teeth of the idle gear 80 and affords freedom of design although the distances between the drive pinion shaft 58, power takeoff shaft 57 and the transmitting shaft 77 are not variable. Preferably, the propeller shaft 82 is covered with a tubular covering 83 and thereby protected from water and mud.

According to this invention, the engine power is transmitted in the following manner. The torque of the engine 4 is delivered at all times from the flywheel 7 to the input main shaft 8 which is connected to the flywheel 7 by the flexible shock-absorbing coupling 11.

The group of gears 9 on the main shaft 8 are always in mesh with the propelling speed change gears 21, 22, 23 and the power takeoff speed change gears 24, 25, 26 which are freely rotatable on the speed change shafts 15, 16. Accordingly the power will not be delivered to the propelling system or the power takeoff system, unless the pins 36 biased by the coiled springs 38 radially inwardly of the shaft are forced outward against the springs and thereby engaged in the grooves in one of the speed change gears. When the lever 33 is turned, slidingly moving the speed change rod 27 within the speed change shaft 15, the annular projection 29 projects the pins 36, opposing for example the speed change gear 21, against the springs 38 and engages them into the grooves 39 formed in the inner peripheral surface of the gear 21. The gear 21 and the speed change shaft 15 are therefore coupled by the pins 36 for the transmission of the torque. With the illustrated embodiment wherein the three speed change gears 21, 22, 23 are mounted side by side on the speed change shaft 15, the three steps of speed changes of first speed → neutral → second speed → neutral → third speed are available merely by axially moving the single speed change rod 27. Such speed changes are effected smoothly with a small shock without the necessity of slowing down the engine 4, since the grooves 39 have a progressively reducing depth in the direction of rotation of the gears as illustrated in FIG. 4. The speed change mechanism is further operable smoothly by virtue of the provision of the rollable balls 37 for the pins 36. The shock-absorbing coupling 11 effectively mitigates the slight shock produced by the speed change action, eliminating the necessity of providing a clutch between the engine 4 and the main shaft 8.

Similarly as above, the power takeoff speed change rod 28, when slidingly moved in the axial bore 16a of the shaft 16, causes the pins 36 to selectively couple the speed change gears 24, 25, 26 to the speed change shaft 16, giving three steps of power takeoff speed changes to deliver the desired torque to the power takeoff shaft 57.

When the clutch gear 55 is moved rightward in FIG. 2, the torque is delivered to the secondary speed change shaft 50 at a greatly reduced speed via the creeping assembly 40 interposed between the speed change shaft 15 and the secondary speed change shaft 50. Conversely when the clutch gear 55 is moved leftward in FIG. 2, the speed change shaft 15 is connected directly to the secondary speed change shaft 50. With the illustrated embodiment wherein the planetary roller 43 comprises the inner and outer metal rings 45, 44 which are joined together by the elastic member 46, the desired torque can be delivered, whereas excess torque is absorbed by the deformation of the elastic member 46 and slippage of the roller 43, with the result the shafts, gears and other parts are rendered durable and free of serious damage.

When the torque is transmitted to the secondary speed change shaft 50 directly or by way of the creeping assembly 40, high and low secondary speed changes are effected in the following manner, permitting the torque to be delivered from the drive pinion shaft 58 to the differential unit 62, from which the torque is further transmitted to the terminal speed reduction means, driving the rear wheels 3. The secondary speed change shaft 50 fixedly carries the large and small gears 53, 54 always meshing with high and low secondary speed change gears 71, 72 which are freely rotatably mounted on the drive pinion shaft 58 directly or with the sleeve 70 interposed therebetween. The drive pinion shaft 58 incorporates, in corresponding relation to the gears 71, 72, pins 36 which are biased by the springs 38 radially inwardly of the shaft 58. The pins 36 are projectable radially outwardly of the shaft 58 by the annular projection 65 when the secondary speed change rod 64 is moved. Thus when the sliding movement of the rod 64 causes the pins 36 to engage in the groove 39 of the gear 71 or the pins 36 to engage in the groove 39 of the gear 72, the gear 71 or 72 is coupled to the drive pinion shaft 58, whereby the torque is delivered to the differential unit 62 with a high or low secondary speed change.

The rearwardly propelling gear 74 idly rotatably mounted on the drive pinion shaft 58 is operatively coupled to the gear 54 by means of an idle gear (not shown). When the gear 74 is coupled to the drive pinion shaft 58 by the sliding movement of the secondary speed change rod 64 by virtue of the engagement of the pins 36 in the grooves 39, the rear wheels 3 are driven reversely. Further when the change gear 78 is selectively engaged with the idle gear 80, the transmitting shaft 77 is driven in synchronism with the rear wheel system.

What is claimed is:

1. A transmission of the three-system type for a tractor comprising an input system having a main input shaft carrying a plurality of gears for transmitting the torque of an engine, a propelling speed change system and a power takeof speed change system supported on the opposite sides of the input system respectively in parallel thereto, each of the propelling and power takeoff speed change system including a speed change shaft having a power output end and having a plurality of speed change gears freely rotatably mounted thereon side by side and meshing with the gears of the input system respectively at all times, the speed change shaft being a hollow shaft internally formed with an axial bore, each of the speed change gears being formed in its inner peripheral surface with grooves, the speed change shaft incorporating pins movable radially of the speed change shaft and engageable in and disengageable from the grooves in the corresponding speed change shaft and engageable and disengageable from the grooves in the corresponding speed change gear, the speed change shaft accomodating in its axial bore an axially movable speed change rod being axially movable to engage the pins in the grooves of the corresponding speed change gear and said speed change rod partially extending outwardly from said speed change shaft and operating force transmitting means provided at an end opposite to said power output end coupled to said partially extending portion of said speed change rod for axially moving said speed change rod whereby the speed change gear is coupled to the speed change shaft to transmit the torque to rear wheels and a power takeoff shaft with desired speed changes, and a flexible shock-absorbing coupling provided between the engine and the main input shaft, said coupling mediating the impact resulting from engagement of the pins in the grooves for a speed change.

2. A transmission for a tractor comprising a flexible shock-absorbing coupling for transmitting the power of an engine to a main shaft, a propelling speed change shaft and a power takeoff speed change shaft supported on the opposite sides of the main shaft respectively in parallel thereto, propelling speed change gears and power takeoff speed change gears freely rotatably mounted side by side on the speed change shafts respectively and meshing with corresponding power transmitting gears on the main shaft, speed change means of the pin engageable type incorporated in each of the speed change shafts coaxially thereof, a power takeoff shaft connected to the power takeoff speed change shaft, a creeping assembly provided between the propelling speed change shaft and a secondary speed change shaft, a drive pinion shaft freely rotatably carrying a rearwardly propelling gear and high and low secondary speed change gears always meshing with large and small gears on the secondary speed change shaft respectively to transmit the power to a differential unit, and secondary speed change means of the pin engageable type incorporated in the drive pinion shaft coaxially therewith.

3. A transmission as defined in claim 2 wherein each of the speed change means of the pin engageable type comprises pins engageable in and disengageable from grooves formed in the inner peripheral surface of each of the speed change gears, coiled springs biasing the pins radially inwardly of the shaft, and a speed change rod for projecting the pins into the grooves against the coiled springs, the pins being so spaced apart that they are positionable in neutral position at intermediate positions of speed changes.

4. A transmission as defined in claim 2 wherein the creeping assembly is of the planetary roller type comprising planetary rollers, each of the rollers including inner and outer metal rings joined together by an elastic member at least diametrically deformable.

5. A transmission for a tractor comprising a flexible shock-absorbing coupling for transmitting the power of an engine to a main shaft, a propelling speed change shaft and a power takeoff speed change shaft supported on the opposite sides of the main shaft respectively in parallel thereto, propelling speed change gears and power takeoff speed change gears freely rotatably mounted side by side on the speed change shafts respectively and meshing with corresponding power transmitting gears on the main shaft, speed change means of the pin engageable type incorporated in each of the speed change shafts coaxially thereof, a power takeoff shaft connected to the power takeoff speed change shaft, a creeping assembly provided between the propelling speed change shaft and a secondary speed change shaft, a drive pinion shaft freely rotatably carrying a rearwardly propelling gear and high and low secondary speed change gears always meshing with large and small gears on the secondary speed change shaft respectively to transmit the power to a differential unit, secondary speed change means of the pin engageable type incorporated in the drive pinion shaft coaxially therewith, and a power takeoff assembly for driving front wheels by way of a power takeoff gear fixedly mounted on the drive pinion shaft.

* * * * *